United States Patent
Meek et al.

[11] Patent Number: 5,621,419
[45] Date of Patent: Apr. 15, 1997

[54] CIRCULAR SLOT ANTENNA

[75] Inventors: Thomas R. Meek, Felixstowe; Ian J. Dilworth, Capel St. Mary, both of England

[73] Assignee: Schlumberger Industries Limited, London, England

[21] Appl. No.: 447,510

[22] Filed: May 23, 1995

[30] Foreign Application Priority Data

May 26, 1994 [GB] United Kingdom ............ 9410557

[51] Int. Cl.$^6$ .................................................. H01Q 13/10
[52] U.S. Cl. .......................................... 343/770; 343/719
[58] Field of Search ................. 343/700 MS, 719, 343/769, 770

[56] References Cited

U.S. PATENT DOCUMENTS

| | | | |
|---|---|---|---|
| 2,586,895 | 2/1952 | Willoughby | 343/770 |
| 2,611,865 | 9/1952 | Alford | 343/769 |
| 2,611,866 | 9/1952 | Alford | 343/769 |
| 2,644,090 | 6/1953 | Dolne | 343/769 |
| 2,684,444 | 7/1954 | Fales | 343/770 |
| 2,791,769 | 5/1957 | Lindenblad | 343/769 |
| 3,364,489 | 1/1968 | Masters | 343/770 |
| 4,835,541 | 5/1989 | Johnson et al. | 343/700 X |
| 4,994,817 | 2/1991 | Munsum et al. | 343/770 |
| 5,298,894 | 3/1994 | Cerney et al. | 343/719 |

*Primary Examiner*—Donald T. Hajec
*Assistant Examiner*—Tho Phan
*Attorney, Agent, or Firm*—Leonard W. Pojunas

[57] ABSTRACT

A radio antenna for mounting in the lid of a water meter box and forming part of a remote meter reading system comprises an annular conductive plate and a circular conductive plate which are coaxial with and parallel to each other and spaced apart to define a slot, the circular plate serving as a ground plate. The antenna has an input in the form of a conductive pillar interconnecting the two members, with a drive input at a selected point along the length of the pillar and a second input on the ground plate. A variable tuning capacitance is disposed between the plates diametrically opposite the conductive pillar. The ground plate also serves for locating the lid in undergrowth or under snow using a metal detector.

16 Claims, 2 Drawing Sheets

CIRCULAR SLOT ANTENNA

FIELD OF THE INVENTION

This invention relates to radio antennae, and is more particularly but not exclusively concerned with a radio antenna for a radio transmitter which is associated with a utility meter, particularly a water meter, for the purpose of transmitting the readings of the meter to a remote receiver.

BACKGROUND OF THE INVENTION

In the United Kingdom, domestic water meters are typically mounted at the bottom of a vertically extending, generally cylindrical, plastics housing, disposed in a pit in the ground just outside the house or other premises whose water supply is being metered. Access to the housing is obtained via a top-mounted lid, known as a pit lid. The lid is generally made of plastic, into which is moulded a metal plate, which serves as an aid to locating the pit in undergrowth or snow by means of a metal detector.

It has been proposed that such water meters should be provided with a radio transmitter for transmitting their readings to a remote receiver, which may for example be a fixed receiver positioned to receive transmissions from water meters within, say, a 500 meter radius, or a mobile receiver carried by a vehicle which periodically drives past the houses or other premises where the meters are located. The transmitters may each be equipped with a simple receiver, which serves to trigger the operation of its transmitter, eg in response to a "wake-up" signal transmitted by the aforementioned vehicle. However, existing remote meter reading systems of these kinds have a limited operating range due to poor antenna performance.

SUMMARY OF THE INVENTION

It is an object of the present invention to provide a simple and inexpensive antenna which is particularly suitable for use with a radio transmitter associated with such a pit-mounted water meter.

According to one aspect of the present invention, there is provided an antenna for a radio transmitter, the antenna comprising:

a pair of planar, generally circular, conductive members which are substantially coaxial with and parallel to each other and spaced apart to define a slot therebetween; and input means comprising a conductive pillar which extends between and electrically interconnects the conductive members, a first input at a selected point along the length of said pillar, and a second input on one of said conductive members.

Thus, in use, the antenna operates as a slot antenna, with said one conductive member serving as a ground member and the other conductive member serving as a drive member, the position of the first input along the length of said pillar being selected to provide impedance matching with the output from the transmitter, typically a 50 ohm coaxial cable. Additionally, when the antenna is used in its intended orientation, in which the common axis of the conductive members is oriented vertically as will be described hereinafter, it produces a vertically polarised transmission, with a radiation pattern similar to that of a vertical dipole but with a slight gain (of the order of 1 dB) in azimuth, which we have found to be particularly advantageous in remote metering applications.

In a preferred embodiment of the invention, said one conductive member is conductive over substantially the whole of its surface area, while the other conductive member is annular, with its outside diameter substantially equal to that of said one conductive member. The width of the annulus is selected to produce a capacitance between the two conductive members which gives the desired tuning range. It is common for the ground plane to be made large, such that its circumference is in excess of a half wavelength. However, reducing the circumference to a half wavelength can increase antenna gain in the optimum direction i.e. close to horizontal. In the particular embodiment of antenna described hereinafter, the feedpoint and plate spacing are set to optimize the performance dictated by the constraints of the water pit dimensions. This results in performance that is similar in terms of gain and direction pattern to an antenna with an extended ground plane and a half wavelength circumference of the annulus. In this embodiment, the ground plane annulus has close to a quarter wave circumference.

The space between the conductive members may be filled with a dielectric material, eg polystyrene.

Advantageously, a variable tuning capacitor is connected between the conductive members, to tune the antenna to the desired operating frequency. Alternatively, a varactor may be connected between the conductive members to permit tuning. Tuning may also be controlled by use of a variable airgap. In each case, the tuning device is preferably connected between the conductive members at a position diametrically opposite said pillar. As a further alternative, tuning may be achieved by varying the spacing between the conductive members.

Conveniently, both conductive members are formed, eg from copper or aluminium, on respective insulating substrates using printed circuit techniques. Alternatively, the members can be made from tin foil or solid metal, eg aluminium.

Preferably, the input comprises a coaxial radio frequency connector mounted on the face of said one conductive member remote from said other conductive member, said connector having an inner conductor passing in an insulated manner through an aperture in said one conductive member and connected to said first input terminal, and an outer conductor connected to said one conductive member.

In a development of the aforementioned preferred embodiment of the invention, in which said other conductive member comprises an annular conductive member, the antenna may include a second annular conductive member concentrically nested within the first mentioned annular conductive member.

This second annular conductive member may have an outside diameter only slightly smaller than the inside diameter of the first annular conductive member, so defining with said one conductive member a slot which mutually couples with that defined by the first annular conductive member with said one conductive member. The second annular member is tuned by means similar to that described for the first annular member. This arrangement provides an increase in bandwidth, which may be required, for example, for operation on two different frequencies where duplex channel spacing is being used, e.g. on an 8 or 45 MHz duplex split or a 3 MHz split at lower frequencies.

Alternatively, the second annular conductive member may be significantly smaller than the first annular conductive member, so forming with said one conductive member a second antenna operating at a significantly different frequency from the antenna based on the first annular conductive member and said one conductive member, eg a VHF antenna and a UHF antenna. In this case, the second annular member will need a feed arrangement similar to that of the first annular member with a suitable isolating transformer between the first and second feed points. The second annulus will also require tuning means similar to those already described.

The antenna may be adapted for use with a radio transmitter associated with a water meter or other measuring or monitoring apparatus disposed in a plastics pit housing by being at least partly moulded into, or secured to the underside of, the lid of the pit housing. In this case, the antenna can additionally serve to provide the detectability function mentioned earlier, rendering a separate moulded-in metal plate unnecessary. In alternative applications where space may be restricted, it is possible to dispose the whole antenna vertically and optimize the asimuthal gain pattern. This gain pattern will be slightly increased gain on the annulus side and a reduced gain on the ground plane side of the antenna. Further, the use of dielectric (polystyrene) between the annulus and the ground plane, as mentioned earlier, will result in a reduction of the required dimensions by the square root of the dielectric constant. This will be particularly useful where space is restricted as compared to the frequency of operation.

The invention also includes a pit lid provided with an antenna in accordance with any of the preceding statements of invention.

The invention will now be described, by way of non-limitative example only, with reference to the accompanying drawings, of which:

Figure 1:
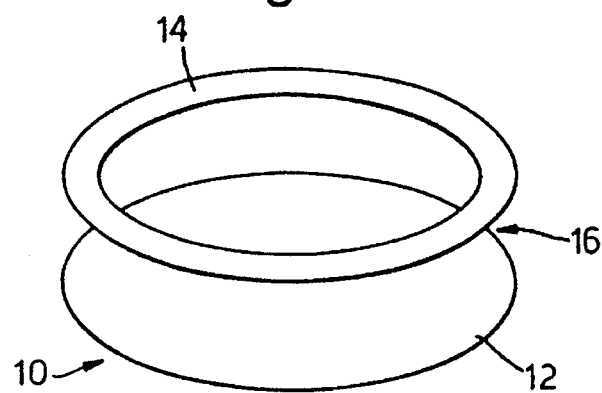
FIG. 1 is a much simplified schematic representation of a preferred embodiment of an antenna in accordance with the present invention, for use with a radio transmitter associated, for remote meter reading purposes, with a water meter disposed in a pit in a plastics housing.

With reference first to FIG. 1, the preferred form of the antenna of the present invention is indicated generally at 10, and comprises in essence a circular conductive plate 12 and an annular conductive plate 14 coaxial with and parallel to the plate 12, and of the same external diameter as the plate 12 (typically about 15 cm). The two plates are spaced apart, typically by about 3.5 cm, to define a circular slot 16 between them, so that the antenna serves as a slot antenna, with the plate 12 serving as the ground plane of the antenna.

The plates 12, 14 can be simple metal plates made from aluminium: however, they are preferably constituted by respective conductive layers formed on respective insulating substrates by conventional printed circuit production techniques.

DETAILED DESCRIPTION

Figure 2:
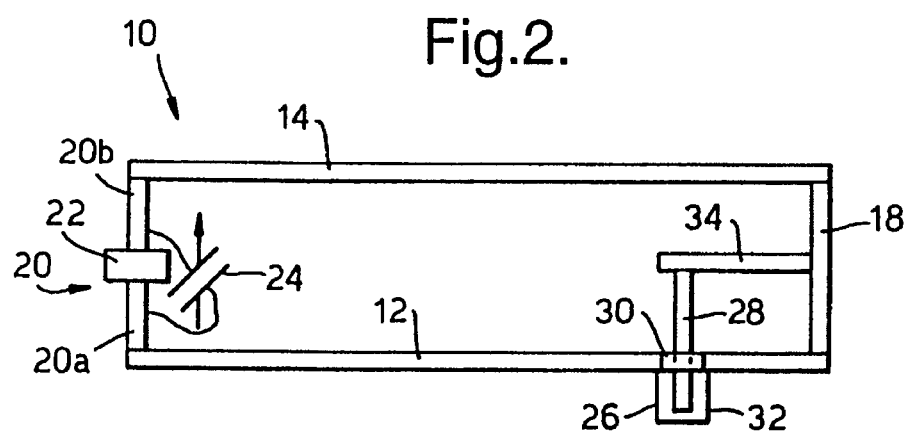
FIG. 2 is a somewhat schematic sectional view of the antenna of FIG. 1, illustrating its electrical arrangement.

As can be seen in FIG. 2, the plates 12, 14 are secured together in spaced apart relationship by two diametrically opposed spacing members or pillars 18, 20. The spacing member 18 is conductive, and electrically connects the plates 12, 14. The spacing member 20 is formed in two conductive parts 20a, 20b which are electrically connected to the plates 12,14 respectively but which are electrically insulated from each other by a small printed circuit board (PCB) shown schematically at 22. A variable tuning capacitor, shown schematically at 24 and having a typical maximum capacitance of 10 pF, is mounted on the PCB 22, and is electrically connected between the parts 20a, 20b of the spacing member 20.

The antenna 10 is provided with a BNC/TNC coaxial RF input connector 26 which is mounted on the underside of the plate 12. The connector 26 has an inner conductor 28 which passes in an insulated manner through an aperture 30 provided in the plate 12, and an outer conductor 32 connected to the plate 12. The inner conductor 28 is connected to a terminal 34 on the spacing member 18, at a height above the plate 12 selected to match the impedance of the antenna 10 to that of the coaxial line (not shown) which forms the output of the radio transmitter (also not shown) served by the antenna. This coaxial line has a typical impedance of 50 ohms, and has a connector which mates with the connector 26.

In use, the variable capacitor 24 is used to tune the antenna 10 to the operating frequency of the transmitter, which is typically of the order of 184 MHz in the United Kingdom, and the antenna produces an omni-azimuthal radiation pattern which is vertically polarised.

Figure 3:
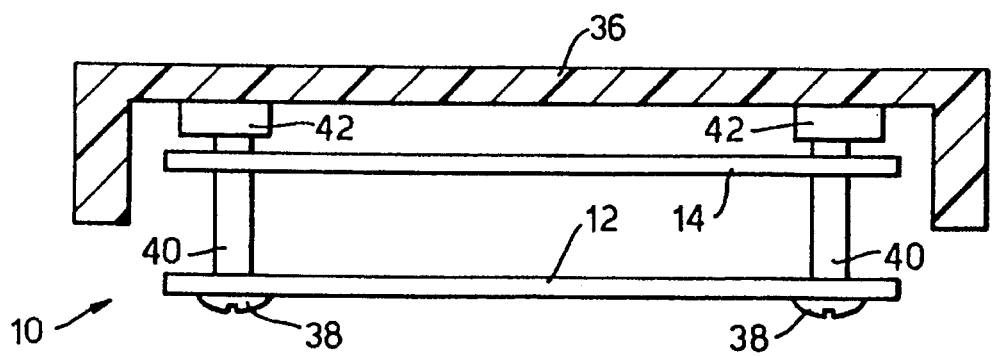
FIG. 3 is another somewhat schematic sectional view of the antenna of FIG. 1, this time illustrating its mechanical arrangement.
Figure 4:
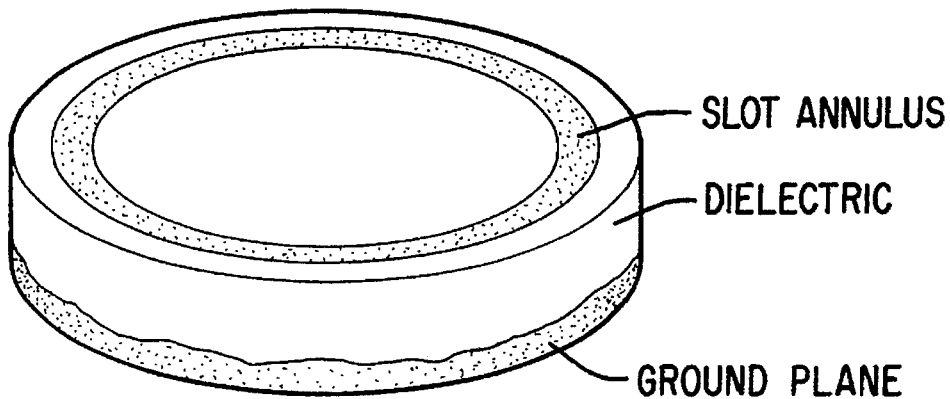
FIG. 4 shows the antenna of FIG. 1 with a dielectric.
Figure 5:
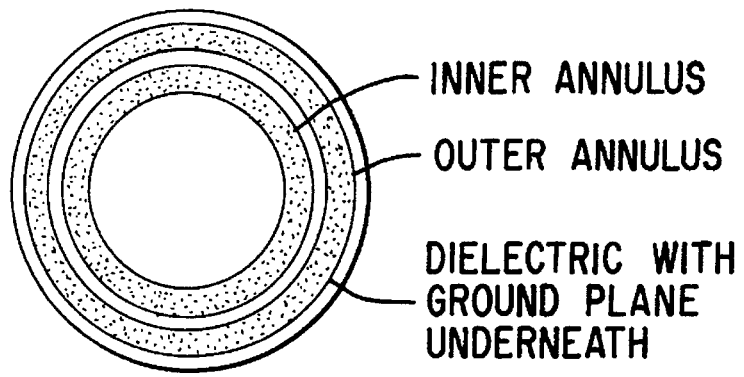
FIG. 5 shows a relatively close-set dual annuli antenna.
Figure 6:
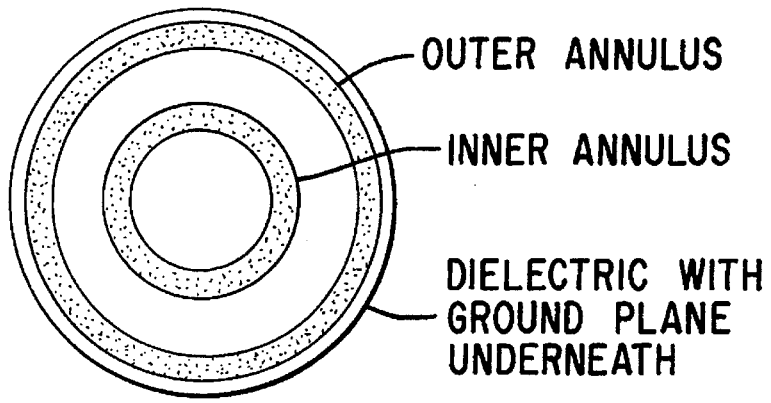
FIG. 6 shows a relatively distant-set dual annuli antenna.

FIG. 3 shows the antenna 10 mounted on the underside of a circular plastics lid 36 of a typical plastics housing of the kind installed in a pit in the ground and used to house a water meter: the housing is not shown in FIG. 3, but it is typically tubular, just over 15 cm in diameter, and about 100 cm deep, with the water meter at the bottom. The antenna 10 is secured to the lid 36 by means of two diametrically opposed self-tapping screws 38, which pass through respective hollow plastic posts 40 disposed between the plates 12, 14 on a diameter at right angles to that joining the spacing members 18, 20. The screws 38 screw into lugs 42 provided on the underside of the lid.

As already mentioned, the water meter is disposed at the bottom of the plastics pit housing. It includes means for providing electrical output signals representative of its reading to the radio transmitter, which is typically mounted in a metal enclosure with its batteries, this metal enclosure being secured to the underside of the plate 12 so as to be electrically connected to it. To improve the effectiveness of the antenna 10, and particularly the effectiveness of the plate 12 as a ground plane, the inside of the top of the tubular pit housing is desirably metallised to a depth extending well below the antenna 10, this metallisation being electrically connected to the plate 12, eg via a connection path including the screws 38.

Many modifications can be made to the described embodiment of the invention.

For example, the space between the plates 12,14 can be filled with a dielectric material such as polystyrene. This enables the size of the antenna to be reduced, as well as preventing water ingress.

In another modification the variable capacitor 24 can be replaced by a high Q varactor diode controlled by the transmitter, or by a bendable tab or screw on or in one of the plates which can be moved towards or away from the other plate to create a variable airgap and thereby serve as a variable capacitance, or the spacing between the plates 12,14 can be made adjustable, as alternative ways of tuning the antenna 10 to the operating frequency of the transmitter.

Yet another modification involves providing a second annular plate concentrically nested within the annular plate 14, in the same plane. This second annular plate can be only slightly smaller than the first, so forming with the circular plate 12 a second slot which mutually couples with the slot 16 (thus removing the need for a separate input). This provides increased bandwidth, suitable for two frequency duplex operation of the kind described in our United Kingdom Patent Application No 9312836.1. Alternatively, the second annular plate can be much smaller than the first, forming with the plate 12 a second antenna having a completely different operating frequency, eg UHF as opposed to VHF. This second antenna is provided with its own input, for connection to a second transmitter, so creating a dual band system. In the limit, several further annular plates can be concentrically internested within the first, combining both the mutually coupled slot concept with the multi-band concept.

Although the antenna 10 has been described in connection with a transmitter, it can also be used with a receiver, or with a combined transmitter/receiver (or transponder).

Finally, although the antenna 10 has been described in the context of a remote water meter reading system, it can of course be used in connection with other kinds of remote measuring or monitoring systems, eg pressure monitoring systems, installed in pits.

We claim:

1. A circular slot antenna for a radio transmitter, the antenna comprising:

a pair of planar, generally circular, conductive members which are substantially coaxial with the parallel to each other and spaced apart to define a slot therebetween and which comprise a first disc-shaped substantially flat conductive member, conductive over substantially its entire surface area and serving as a ground plane of the antenna, and a first annular conductive member, with its outside diameter less than or equal to that of said one conductive member; the antenna further comprising;

input means comprising an elongated conductive pillar which extends between and electrically interconnects the conductive members, a first input at a selected point along the length of said pillar, and a second input on the disc-shaped conductive member serving as ground plane of the antenna.

2. A circular slot antenna as claimed in claim 1, wherein the slot between the conductive members is filled with a dielectric material.

3. A circular slot antenna as claimed in claim 2, wherein said dielectric material is polystyrene.

4. A circular slot antenna as claimed in claim 1, wherein a tuning device in the form of a variable tuning capacitor is connected between the conductive members, to tune the antenna to the desired operating frequency.

5. A circular slot antenna as claimed in claim 1, wherein a tuning device in the form of a varactor is connected between the conductive members, to tune the antenna to the desired operating frequency.

6. A circular slot antenna as claimed in claim 1, wherein a variable airgap tuning device is connected to one of the conductive members, to tune the antenna to the desired operating frequency.

7. A circular slot antenna as claimed in claim 6, wherein the tuning device is connected between the conductive members at a position diametrically opposite said pillar.

8. A circular slot antenna as claimed in claim 1, wherein both conductive members are formed on respective insulating substrates using printed circuit techniques.

9. A circular slot antenna as claimed in claim 1, wherein both conductive members are made from solid metal.

10. A circular slot antenna as claimed in claim 9, wherein said metal is tin foil or aluminium.

11. A circular slot antenna as claimed in claim 1, wherein the input means comprises a coaxial radio frequency connector mounted on the face of said disc-shaped conductive member remote from said annular conductive member, said connector having an inner conductor passing in an insulated manner through an aperture in said disc-shaped conductive member and connected to said first input, and an outer conductor to said disc-shaped conductive member.

12. A circular slot antenna as claimed in claim 1, further comprising a second annular conductive member concentrically nested within the first mentioned annular conductive member.

13. A circular slot antenna as claimed in claim 12, wherein the second annular conductive member has an outside diameter only slightly smaller than the inside diameter of the first annular conductive member, so defining with said one conductive member a slot which mutually couples with that defined by the first annular conductive member with said one conductive member.

14. A circular slot antenna as claimed in claim 12, wherein the second annular conductive member is significantly smaller than the first annular conductive member, so forming with said one conductible member a second antenna having a significantly different operating frequency from that of the antenna based on the first annular conductive member and said one conductive member.

15. A circular slot antenna as claimed in claim 12, wherein the input means further comprises a second elongate conductive pillar extending between and electrically interconnecting the second annular conductive member and said disc-shaped conductive member, a first input at a selected point along the length of the second elongate conductive pillar and a second input on said disc-shaped conductive member.

16. A lid for a pit-mountable water meter box, the lid having an antenna as claimed in claim 1 moulded thereinto or secured to its underside.

* * * * *